Feb. 28, 1961 N. D. NEWBY 2,973,506
MAGNETIC TRANSLATION CIRCUITS
Filed June 10, 1958
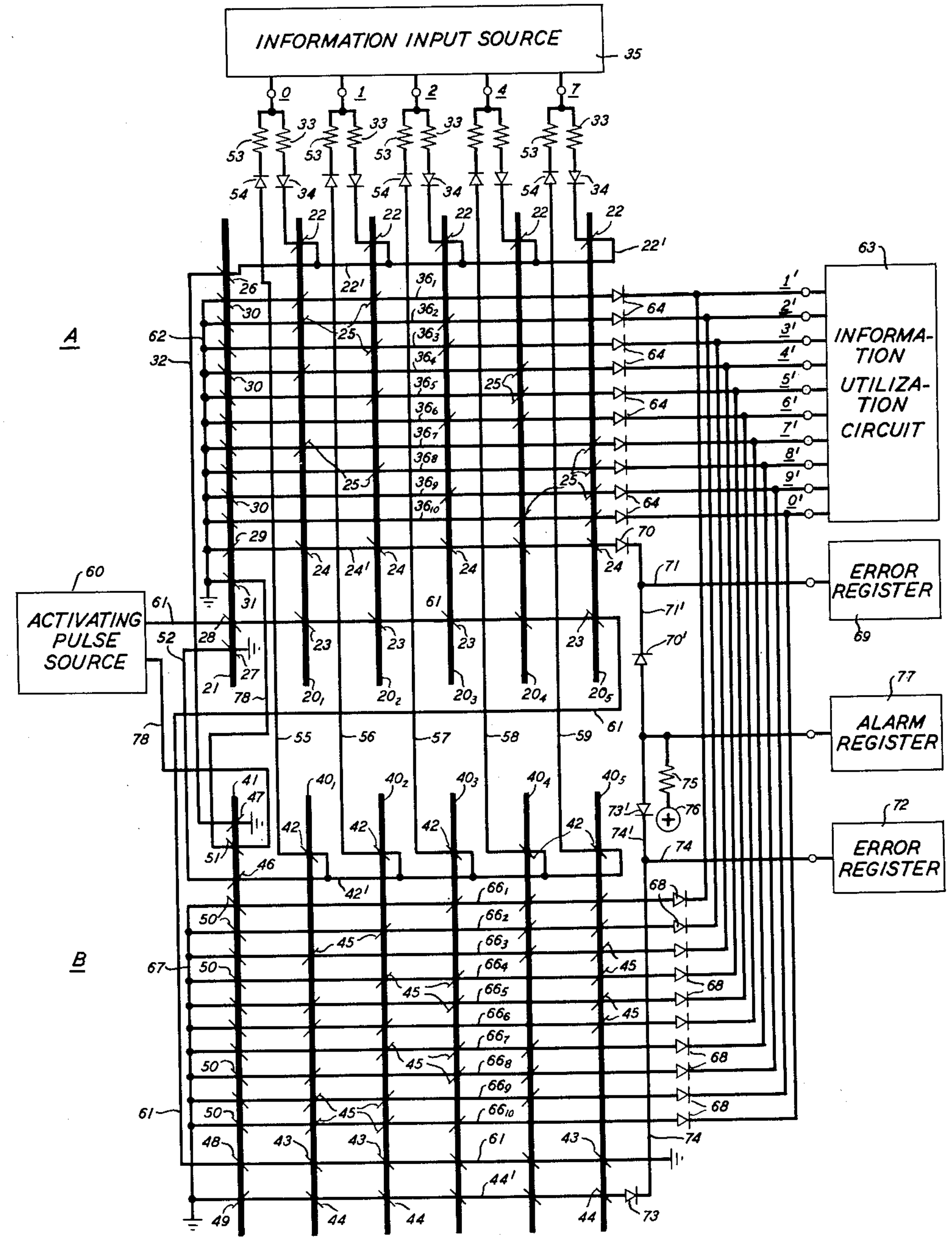
INVENTOR
N. D. NEWBY
BY William H. Kamstra
ATTORNEY United States Patent Office 2,973,506

Patented Feb. 28, 1961

2,973,506

MAGNETIC TRANSLATION CIRCUITS

Neal D. Newby, Leonia, N.J., assignor to Bell Telephone Laboratories, Incorporated, New York, N.Y., a corporation of New York Filed June 10, 1958, Ser. No. 741,122

13 Claims. (Cl. 340—147)

This invention relates to information processing systems and particularly to code translator circuits capable of detecting and correcting errors in the coded information to be translated.

In information handling circuits generally it has been found that errors appearing in the coded information are more frequently the result of the loss of information bits than the generation of spurious information. During such processing steps as recording on and reading from magnetic media, for example, loss of information bits is often attributable to dust particles occurring between the medium and the recording and reading heads and even to defects in the magnetic medium itself. Of course, by providing sufficient redundancy in the stored information, loss of specific bits may be guarded against and in one known arrangement this method is employed. A pair of tandemly connected record-read heads write and sense the data twice on the magnetic medium. This method, however, obviously involves an inefficient and uneconomical use of the magnetic medium. Furthermore, the redundacy of information storage can hardly correct for loss of information bits which are traceable to defective conditions in the associated circuitry. A convenient point in the information handling process at which errors resulting from a loss of specific bits may be intercepted and provided for is a point at which the information is translated from one coded form to another. At such a point it is obviously also highly advantageous that any errors appearing in one code form not be transmitted to the other.

Accordingly, it is an object of this invention to provide a new and improved code translation circuit which is capable of detecting errors due to loss of information bits in information processing systems arising from whatever source and which circuit is also capable of correcting such errors.

Another object of this invention is the generation, in code translation circuits capable of detecting and correcting errors, of an output signaling the occurrence of an error which has not been corrected.

It is also an object of this invention to generate, in circuits for detecting and correcting errors in information processing systems, a signal indicating the occurrence of an error and the fact of its correction.

Still another object of this invention is the provision of a new and improved error detection and correction circuit.

The foregoing and other objects of this invention are realized in one illustrative embodiment thereof in which the information is simultaneously introduced in two codes for translation into a third code. The information is introduced on the one hand in the form of the well-known two-out-of-five code into one section of the circuit and on the other hand in the reciprocal three-out-of-five-code into another section of the circuit. Each section of the circuit may in part conveniently comprise a magnetic core circuit similar to that of the digit registers described in my copending application Serial No. 703,216, filed December 16, 1957, now Patent No. 2,939,109, granted May 31, 1960.

It is a feature of this invention that the translation windings of the cores of each section are parallelly connected to one-out-of-ten output leads in a manner such that a correct translation in either section will produce the required translation of the information into a decimal output. Thus an error resulting from a loss of any or even all of the bits in either section will be corrected in the other.

Another feature of this invention provides an output signal for indicating the fact that an error has occurred in one of the input sections and that the error has been corrected in the other. Each of the sections is provided with an error circuit which is operative to generate a signal only on the occasion when no output is produced in the one-out-of-ten translation outputs of the section.

Still another feature of this invention provides for the generation of another signal indicating the introduction of error information of a character for which no correction was made. Thus, if an error is introduced into both sections of the translating circuit, the error signals mentioned previously are advantageously combined by means of an AND circuit on a separate output conductor to produce an alarm signal indicating the fact of the uncorrected error.

A complete understanding of the organization and structure of this invention together with other objects and features thereof may be gained from a consideration of the detailed description which follows when taken in conjunction with the accompanying drawing, the single figure of which shows a schematic presentation of an illustrative embodiment according to the principles of this invention. For the sake of clarity the well-known mirror symbol notation is employed in the drawing to represent the magnetic cores and their windings. This convention is described in detail in the article entitled, "Pulse-Switching Circuits Using Magnetic Cores," by M. Karnaugh appearing in the Proceedings of the IRE, Vol. 43, of May 1955.

Referring now to the drawing, an illustrative translating circuit according to the principles of this invention is shown to be divided into at least two sections, such as the sections A and B. Each of the sections comprises a plurality of translation magnetic cores and an error magnetic core, the cores being of the well-known type displaying substantially rectangular hysteresis characteristics. The cores of the A section comprise the translation cores $20_1$ through $20_5$ and an error core 21 and the cores of the B section comprise the translation cores $40_1$ through $40_5$ and an error core 41. Each of the translation cores 20 has inductively coupled thereto an input winding 22, an activating winding 23, an error winding 24, and a plurality of output windings 25. The error core 21 has inductively coupled thereto a pair of input windings 26 and 27, an activating winding 28, an error winding 29, a plurality of output windings 30, and a trigger winding 31.

Each of the translation cores 40 of the B section has inductively coupled thereto an input winding 42, an activating winding 43, an error winding 44, and a plurality of output windings 45. The error core 41 has inductively coupled thereto a pair of input windings 46 and 47, an activating winding 48, an error winding 49, a plurality of output windings 50, and a trigger winding 51. Each of input windings 22 of the translation cores 20 is connected at one side via a conductor 22' to the input winding 26 of the error core 21 which latter winding is connected to ground through the input winding 47 of the error core 41 of the B section via a conductor 32. Each of the input windings 42 of the translation cores 40 is connected at one side via a conductor 42' to the input winding 46 of the error core 41 which latter winding is connected to ground through the input winding 27 of the error core 21 of the A section via a conductor 52. The other side of each of the input windings 22 of the cores 20 is connected through a resistance element 33 and a diode 34 to terminals of an information input source 35. The latter source 35 may conveniently comprise any of the sources known in the art capable of providing current pulses of the character to be described hereinafter representing elements of the well-known two-out-of-five code and its reciprocal three-out-of-five code. In accordance with those codes, five terminals of the source 35 are designated 0, 1, 2, 4, and 7, which terminals are associated with the input windings 22 of the cores $20_1$ through $20_5$, respectively. A circuit may thus be traced from each of the terminals 0, 1, 2, 4, and 7 through the input windings 22 of the cores $20_1$ through $20_5$, respectively, the input winding 26 of the error core 21 of the A section, and the input winding 47 of the error core 41 of the B section.

The other side of each of the input windings 42 of the cores $40_1$ through $40_5$ is connected through a resistance element 53 and a diode 54 also to the terminals 0, 1, 2, 4, and 7 to the information input source 35 via conductors 55 through 59, respectively. A circuit may thus also be traced from each of the terminals 0, 1, 2, 4, and 7 through the input windings 42 of the cores $40_1$ through $40_5$, respectively, the input winding 46 of the error core 41 of the B section, and the input winding 27 of the error core 21 of the A section. The activating windings 28, 23, 48, and 43 of the error and translation cores of the A and B sections are serially connected between an activating current pulse source 60 and ground by means of a conductor 61.

The output windings 25 and 45 of the translation cores of the A and B sections are connected in combinations corresponding to the code to which input information introduced into the sections is to be translated. Since the latter code, in the illustrative embodiment being described, is a one-out-of-ten or decimal code, ten translation circuits are provided for each section. In the A section, ten translation circuits $36_1$ through $36_{10}$ are provided, each of which includes the output windings 25 of two of the translation cores 20 in combinations corresponding to the two-out-of-five input code. Specific output windings 25 connected in the translation circuits 36 for each of the one-out-of-ten output code elements will be considered in connection with a detailed description of the operation of this invention hereinafter. Also included in each of the translation circuits 36 is one of the output windings 30 of the error core 21 and each of the circuits 36 is connected between a ground bus 62 and the decimal terminals 1' through 0' of an information utilization circuit 63 through a diode 64.

In the B section, ten translation circuits $66_1$ through $66_{10}$ are provided, each of which includes the output windings 45 of three of the translation cores 40 in combinations corresponding to the reciprocal three-out-of-five input code. Specific output windings 45 connected in the translation circuits 66 for each of the one-out-of-ten output code elements will also be considered in connection with a detailed description of the operation of this invention hereinafter. Also included in each of the translation circuits 66 is one of the output windings 50 of the error core 41 and each of the circuits 66 is connected between a ground bus 67 and the decimal terminals 1' through 0' of the information utilization circuit 63 through a diode 68. The terminals 1' through 0' are thus adapted to receive alternative or simultaneous signals from the A and B sections.

The error windings 24 and 29 of the translating cores 20 and error core 21, respectively, are serially connected in an error circuit 24' between the ground bus 62 and an error register circuit 69 through a diode 70 via a conductor 71. Similarly, the error windings 44 and 49 of the translating cores 40 and error core 41, respectively, are serially connected in an error circuit 44' between the ground bus 67 and an error register circuit 72 through a diode 73 via a conductor 74. Both of the conductors 71 and 74 are also connected together and to one side of a resistance element 75 through the diodes 70' and 73' by means of the conductors 71' and 74', respectively. The resistance element 75 is connected at its other side to a positive D.C. potential source 76 such that the diodes 70' and 73' and the resistance element 75 comprise an AND gate for gating simultaneous signals on the conductors 71' and 74' to an alarm register circuit 77. Each of the circuits 63, 69, 72, and 77, shown in the drawing only in block symbol form, may conveniently comprise any of the circuits known to one skilled in the art capable of utilizing the coded signals representing the various information signals generated by this invention.

The trigger windings 31 and 51 of the error cores 21 and 41, respectively, are serially connected by means of a conductor 78 to the activating current pulse source 60 such that trigger signals appearing on the conductor 78 may be available to control the energization of the current pulse source 60. The sense of the various windings of the cores described in the foregoing together with the turns ratios, where this information is pertinent, will be described in connection with the description of the operation of this invention which follows. Similarly, the polarity of the various diodes and current directions will also be considered hereinafter.

Assume initially in the operation of this invention that each of the cores of both sections have a remanent magnetization therein which may be thought of as "down," as viewed in the drawing in accordance with the mirror symbol notation, as the result of a previous phase of operation. This magnetization is also conventionally described as the "reset" condition. In the description of an illustrative translation operation of this invention, it will in the first instance be assumed that information representative of the decimal digit 5 is properly introduced into the circuit from the information input source 35. This information will be simultaneously introduced in the two-out-of-five code and in its reciprocal three-out-of-five code. In accordance with the former code, positive input current pulses will be applied from the input terminals 1 and 4, through the biasing resistance elements 33, the forward-biased diodes 34, to the input windings 22 of the translation cores $20_2$ and $20_4$, respectively. As read from the mirror symbols representing the windings, the latter cores will be switched to a remanent magnetization which may be thought of as "up," as viewed in the drawing. This condition will henceforth be termed the "set" magnetic condition. The positive current pulses from the input source 35 will also be applied via the conductor 22' to the input winding 26 of the error core 21 which latter core is also set "up."

Simultaneously with the application of positive current pulses applied to the input terminals 1 and 4 in accordance with the two-out-of-five code, the reciprocal three-out-of-five code elements are applied to the remainder of the input terminals in the form of negative current pulses. Thus, negative current pulses are applied from the input information source 35 to the terminals 0, 2, and 7. The negative current pulses accordingly representing the decimal digit 5 are thereby applied through the resistance elements 53, diodes 54, conductors 55, 57, and 59 to the input windings 42 of the translation cores $40_1$, $40_3$, and $40_5$, respectively, of the B section. Although, the input current pulses with respect to the B section are negative, the sense of the input windings 42 is such that the latter cores will also be set by the magnetomotive forces produced, as is apparent from the mirror symbols of the drawing. The negative current pulses transmitted from the source 35 via the terminals 0, 4, and 7 will also be applied via the conductor 42' to the input winding 46 of the error core 41 which latter core also will be set. It should be noted that the positive and negative input current pulses are also applied from the input windings 26 and 46 of the error cores 21 and 41, respectively, via conductors 32 and 52 to the input windings 47 and 27 of the error cores 41 and 21, respectively. Thus, the error cores 21 and 41 will be set by input current pulses applied to either or both of the sections. Advantages of this dual input operation for setting the error cores will become apparent from a description of the operation of the error circuits hereinafter. The input information source 35 may now be additionally described in functional terms as one capable of selectively applying simultaneous current pulses of suitable magnitude and polarity on each of the input terminals 0, 1, 2, 4, and 7 in accordance with information in the reciprocal codes. The information input or registration phase of operation of the circuit has thus left the cores $20_2$ and $20_4$ of the A section and the cores $40_1$, $40_3$, and $40_5$ of the B section in a set magnetic condition.

During the activating phase of operation of this invention the activating current pulse source 60 is triggered, in a manner to be described, to produce a positive current pulse which is applied via the conductor 61 to the activating windings 28 and 23 of the error core 21 and translation cores 20, respectively, of the A section and also to the activating windings 48 and 43 of the error core 41 and translation cores 40, respectively, of the B section. As a result, all of the cores set during the registration phase of operation will now be switched to the reset condition. Thus, the error core 21 and the translation cores $20_2$ and $20_4$ of the A section will be switched as well as the error core 41 and the translation cores $40_1$, $40_3$, and $40_5$ of the B section, and output voltages will be induced in the well-known manner across the output windings of each of these cores. Accordingly, in the A section an output voltage will be induced across each of the output windings 25 of the cores $20_2$ and $20_4$ and, in addition, an output voltage will be induced across each of the output windings 30 of the error core 21. The output windings 25 of the translation cores 20 are in a sense such that a positive voltage will be induced therein by the switching to a reset magnetic condition of the coupled core. The output windings 30, on the other hand, are in the opposite sense and a negative voltage will be induced therein by the reset switching of the error core 21. Each of the output windings 30 has the same number of turns as each of the output windings 25 so that a voltage induced in a single output winding 25 in a translation circuit 36 is effectively completely canceled by the opposing voltage induced in an output winding 30. Accordingly, in order to produce a net positive resultant voltage in an output circuit of the A section, a translation circuit 36 must be found in which such a signal will be the additive resultant. An inspection of the drawing reveals that the translation circuit $36_5$ and only this circuit has included therein energized output windings such as to meet this requirement. Each of the other output windings 25 of the resetting cores $20_2$ and $20_4$ appears in a translation circuit 36 in which no other energized output winding 25 appears. In each of the latter circuits 36 the voltage induced in the output winding 30 by the switching of the error core 21 will accordingly be sufficient to prevent any positive output signal from appearing. A net positive resultant signal thus is generated only in the translating circuit $36_5$ and this positive signal is applied through a forward-biased diode 64 to the terminal 5' where it will be available to the one-out-of-ten decimal information utilization circuit 63 representative of the information originally introduced from the input information source 35. A complete normal translation operation of the A section has thus been described.

In a similar manner an output signal also representative of the information introduced from the source 35 will be generated in the B section. Thus, as a result of the switching of the cores $40_1$, $40_3$, and $40_5$ to their reset conditions in the activating phase of operation, output voltages will be induced in each of the output windings 45 of the latter cores. The output windings 45 of the translation cores 40 are in a sense such that a positive voltage will be induced therein. However, the output windings 50 are in the opposite sense and a negative voltage will be induced therein by the switching of the error core 41. Each of the output windings 50 has twice the number of turns as each of the output windings 45 so that a cumulative voltage induced in less than three of the output windings 45 in a translation circuit 66 is either effectively evenly canceled by the opposing voltage induced in an output winding 50 or is overridden to produce a net negative signal in the translating circuit. Such a negative signal would be blocked by the diode 68. Thus, to obtain a net positive resultant output signal, a translating circuit 66 must be found having included therein the three output windings 45 coupled to the switching cores $40_1$, $40_3$, and $40_5$. An inspection of the drawing shows the translation circuit $66_5$ and only this circuit to meet this requirement; accordingly, a net positive output signal will be applied through a forward-biased diode 68 to the multiple of the terminal 5'. A signal representative of the information introduced from the source 35 has thus been applied to the terminal 5' from both the A and the B sections. Obviously, an error caused by the failure to generate the proper output signal in one section would still result in a proper information signal from the other section. As has been mentioned, the voltage generated in translation circuits of either section other than the ones effective to provide a net positive signal will be either effectively canceled by opposing voltages generated by the error cores or will be of a polarity such as to back-bias the diodes 64 and 68. In a similar manner, translation of digital information other than the illustrative digit 5 may be normally translated by the dual operation of the reciprocal codes.

In the foregoing what has been described has been the normal operation of this invention in the translation of information from two codal forms to a third. In accordance with the error detection and correction feature of this invention provision is also made for occasions when less than all of the elements of either of the input codes are introduced. Thus, a result of the loss of information bits, less than both of the two elements of the two-out-of-five code may be introduced or, for the same reason, less than all of the three elements of the three-out-of-five code may be introduced. Assume for purposes of description, first that a loss of information bits in connection with the introduction of the illustrated digital information into the A section, which was described above with respect to normal operation, has occurred and that one of the positive input current pulses from the source 35 is missing. For this purpose, it will be immaterial which of the two positive pulses is found as missing; accordingly, it will be assumed that the signal on the 1 input terminal fails to appear. The translation core $20_2$ will, as a result, not be set and, in the activating phase of operation, also not be switched to reset. No output voltage will be induced in its output winding 25 included in the translation circuit $36_5$. As a result, the output voltage induced across the winding 25 of the translation core $20_4$ will alone be available to oppose the voltage induced across the output winding 30 of the error core 21 also appearing in the translation circuit $36_5$. Since the latter output windings are equal in the number of turns and opposite in sense, the induced voltages effectively cancel and no output signal appears on the terminal 5′ from the A section. As previously explained, and assuming a normal input to the B section, an output signal representative of the digital input information will still appear from the multipled outputs of the B section to the one-out-of-ten terminal 5′.

During the normal operation of the invention, the voltage induced across the error winding 29 by the resetting of the error core 21 will be effectively canceled by the cumulative voltages induced across the error windings by the resetting of the translation cores $20_2$ and $20_4$ since each of the windings 24 has one half as many turns as the winding 29. However, at this time the core $20_2$ is not switched and, as a result, only the voltage induced in the error winding 24 of the resetting core $20_4$ is available to oppose the voltage in the error winding 29. Since the latter voltage is opposite in polarity and greater in magnitude than the now single voltage induced by the switching core $20_4$, a net positive output signal is applied through the forward-biased diode 70 to the error output conductor 71 for transmission to the error registration circuit 69. The error resulting from loss of information bits to the A section is in this manner detected and a signal indicative of the error in that section transmitted to interested associated circuitry. Should both of the two-out-of-five code elements have been missing so that no input signals at all are applied to the input windings 22, and thereby to the input winding 26 of the error core 21, the latter core will still be set by input currents applied to the presumably normally operating B section. As previously described, the latter input currents are applied to the error core 21 input winding 27 via the conductor 52.

In a similar manner, in connection with the B section, should one or more of the elements of the three-out-of-five reciprocal code be missing due to the loss of information bits less than the necessary three translation cores 40 will be set and, subsequently, switched to reset. As a result, less than the required magnitude of cumulative voltages will be induced in the particular translation circuit, in this case, circuit $66_5$, to overcome the opposite polarity voltage induced in the winding 50 of the resetting error core 41. As previously described, no signal in such a case is applied through the multipled outputs to the one-out-of-ten terminal 5′ from the B section due to the blocking action of the diodes 68. The error winding 49 of the resetting error core 41 is opposite in sense to, and is provided with three times the number of turns as, each of the error windings 44 of the three normally switching translation cores 40. Thus with less than three translation cores 40 being reset during the activating phase of operation, the voltage induced across the winding 49 will be opposite in polarity and greater in magnitude than the cumulative other voltages in the error circuit 44′. The sense of the error winding 49 is such that a net positive output signal is applied through the forward-biased diode 73 to the error output conductor 74 for transmission to the error registration circuit 72. The error resulting from loss of information bits to the B section is thus detected and a signal indicative of the error transmitted to interested associated circuitry. Should all of the three-out-of-five code elements have been missing so that no input signals are applied to the input windings 42, and thereby to the input winding 46 of the error core 41, the latter core will still be set by input currents applied to the presumably normally operating A section. As previously described, the latter input currents are applied to the error core 41 input winding 47 via the conductor 32.

In the foregoing description of the operation of the error detecion and correction feature of this invention it has been assumed that, although an error appeared in one section, the information to be translated appeared in correct codal form in the other section. In practice such alternative operation may not always occur and the situation may arise in which an error due to loss of information bits is introduced into both of the sections. Thus, if one element of the two-out-of-five code is missing simultaneously with the loss of one or two elements of the reciprocal three-out-of-five code, error signals apprising of these errors will be transmitted to both of the error registration circuits 69 and 72 in the manner described in detail hereinbefore. To provide an alarm for the complete failure of translation, the simultaneous error signals are advantageously applied to the AND gate comprising the diodes 70′ and 73′ and resistance element 75 for transmission to the alarm register circuit 77 to register the fact that the error was of a nature which was not corrected by the translation circuit.

The operation of this invention with respect to the loss of information bits originating in external circuitry alone has been described. The failure to introduce the necessary number of elements of a code in one section may, however, also result from the introduction of spurious elements in the other section. Thus, for example, if more than two elements of the two-out-of-five code, say, three elements, are introduced into the A section, at least three translation circuits 36 will be energized to produce three ambiguous signals on the decimal output terminals. Advantageously, however, due to the use of reciprocal codes sharing a limited number of inputs, such a spurious signal in one section will result in a loss in the other section and an error signal will also be generated for transmission to one of the error registration circuits 69 or 72.

One further operation is accomplished during the activating phase of the translation circuit. Upon the switching of the error cores 21 and 41 an output voltage is also induced in the trigger windings 31 and 51, respectively. These voltages, either alternatively or cumulatively, are conducted via the conductor 78 to trigger the activating current pulse source 60 for periodic operation. Obviously, a suitable delay circuit of any well-known character comprises a part of the source 60 to permit the timing of the injut phase of operation. After the resetting of all of the cores of both sections the circuit is again prepared for the introduction therein of coded elements of information from the source 35.

The error cores 21 and 41 have been described as set by the introduction of input current pulses to the input windings of the translation cores of the sections. This invention may also be adapted to accept synchronizing current pulses to set the error cores separately and simultaneously with the introduction of input information. Thus a source of sync pulses, which may, for example, comprise the sync track of a magnetic storage medium, may be provided to apply setting current pulses to the input windings 26 and 27, and 46 and 47, respectively, of the error cores 21 and 41, instead of utilizing the information input current pulses for this purpose.

What has been described is considered to be only one illustrative embodiment according to the principles of this invention and it is to be understood that numerous other arrangements may be devised by one skilled in the art without departing from the spirit and scope of this invention.

What is claimed is:

1. An electrical circuit comprising a first and a second translating means, input means for introducing particular information in said first and second translating means in a first and a second code, respectively, means for activating said first and second translating means, first output circuit means energized responsive to the activation of either said first or said second translating means for generating output signals representative of said particular information in a third code, second and third output means energized responsive to the occurrence of an error in said particular information in said first and second translating means, respectively, for generating first error output signals, and fourth output means energized responsive to the occurrence of an error in said particular information in both of said first and second translating means for generating a second error output signal.

2. An electrical circuit as claimed in claim 1 in which each of said first and second translating means comprises a plurality of magnetic cores each having a substantially rectangular hysteresis characteristic, means for setting particular ones of said cores in accordance with said particular information, means including an activating winding for each of said cores for resetting each of said cores, output windings for each of said cores, and circuit means for connecting the output windings of said particular cores in accordance with said third code.

3. An electrical circuit comprising a first and a second translating means each comprising a plurality of translating magnetic cores each having a substantially rectangular hysteresis characteristic, input means for setting particular ones of said plurality of cores in each of said first and second translating means in accordance with input information in a particular code, means incuding an activating winding for each of said cores for resetting said particular ones of said cores, a plurality of output windings for each of said cores, and circuit means for connecting the output windings of said particular ones of said cores in accordance with another code, and output circuit means energized responsive to the resetting of said particular ones of said cores of either said first or said second translating means for generating output signals representative of said input information in said other code.

4. An electrical circuit as claimed in claim 3 in which each of said translating means also comprises an error magnetic core having a substantially rectangular hysteresis characteristic, means for setting said error core at each setting of any of said translating cores, output windings for said error core, a second output winding for each of said translating cores, circuit means for connecting an output winding of said error core to the second output windings of said particular ones of said cores, and first error output circuit means energized responsive to the resetting of less than said particular ones of said cores and said error core for generating a first error output signal.

5. An electrical circuit as claimed in claim 4 also comprising second error output circuit means energized responsive to a first error output signal on the first error output circuit means of each of said first and said second translating means for generating a second error output signal.

6. A code translator comprising a plurality of translating means, input circuit means for introducing particular information in each of said translating means in a different code, first output circuit means energized responsive to the activation of any one of said translating means for generating output signals representative of said particular information in still another code, a plurality of first error circuit means energized responsive to the occurrence of erroneous information in said plurality of translating means for generating respectively first error output signals, and a second error output circuit energized responsive to the occurrence of erroneous information in each of said plurality of translating means for generating a second error output signal.

7. A code translator circuit comprising a plurality of translating means, each of said translating means comprising a plurality of translating magnetic cores and an error core, each core having a substantially rectangular hysteresis characteristic, an input, an activating, and a plurality of output windings for each core, means including said input windings for setting said error core and particular ones of said translating cores in accordance with information in one code, a plurality of translating circuit means including said output windings in predetermined combinations, a first error circuit means connecting an output winding of said error core and an output winding of each of said translating cores, and means including said activating windings for switching said error core and said particular ones of said translating cores to induce voltages in the output windings of said last-mentioned cores, said voltages being combined in said translating circuits to produce an information output signal when said information is correct and being combined in said first error circuit to produce an error output signal when said information is incorrect; and an output circuit means energized responsive to an information output signal from any one of said plurality of translating means for generating an output signal representative of said information in another code.

8. A code translator circuit as claimed in claim 7 in which the sense and the number of turns of the output winding of the error core with respect to the sense and the number of turns of the output windings of the translating cores included in each of said translating circuit means are such that the total voltage induced across the latter output windings is opposite in polarity to and greater in magnitude than the voltage induced across the former output winding.

9. A code translator circuit as claimed in claim 8 in which the sense and the number of turns of the output winding of the error core with respect to the sense and the number of turns of the output windings of the translating cores in each of said first error circuit means are such that the voltage induced across the former output winding is opposite in polarity and greater in magnitude than the total voltage induced across the latter output windings when less than said particular ones of said translating cores are switched.

10. A code translator circuit as claimed in claim 9 also comprising a second error circuit means energized responsive to an error output signal in each and all of said first error circuit means for generating a second error output signal.

11. An electrical circuit comprising a first and a second translating means, means for simultaneously introducing input information in said first and said second translating means in elements of a first and a reciprocal code, respectively, means for activating said first and said second translating means, information output circuit means for each of said translating means energized responsive to the activation of the associated translating means for generating an information signal only when all of the elements of the respective code are present in the associated translating means, a first error output circuit means for each of said translating means energized responsive to the activation of the associated translating means for generating a first error output signal only when less than all of the elements of the respective code are present in the associated translating means, a second error output circuit means energized responsive to the activation of said translating means for generating a second error output signal only when less than all of the elements of said codes are present in both of said translating means, and means for generating an output signal representative of said input information in a third code responsive to an information signal from each of said first or second translating means.

12. A code translation circuit comprising first registering means for registering particular information in $m$ elements of an $n$ element code, a second registering means for registering said particular information in $(n-m)$ elements of said $n$ element code, means for simultaneously activating said first and said second registering means, means for generating an output signal representative of said particular information in $x$ elements of a $y$ element code responsive to the activation of either said first or said second registering means, a third registering means for registering erroneous information in less than $m$ elements of said $n$ element code, a fourth registering means for registering other erroneous information in less than $(n-m)$ elements of said $n$ element code, means for activating said third and said fourth registering means and means responsive to the activation of said third and said fourth registering means for generating error output signals representative of said erroneous information in each of said last-mentioned registering means.

13. A code translation circuit according to claim 12, also comprising means responsive to the generation of error output signals from both of said third and said fourth registering means for generating a double error output signal.

References Cited in the file of this patent

UNITED STATES PATENTS

| | | |
|---|---|---|
| 2,484,226 | Holden | Oct. 11, 1949 |
| 2,522,609 | Gloess | Sept. 19, 1950 |
| 2,691,152 | Stuart-Williams | Oct. 5, 1954 |
| 2,857,100 | Franck et al. | Oct. 21, 1958 |

OTHER REFERENCES

RCA Review, June 1952, vol. 13, No. 2 (pp. 183–201 relied on).